(12) United States Patent
Padula (10) Patent No.: US 6,330,486 B1
(45) Date of Patent: Dec. 11, 2001

(54) ACOUSTIC PERSPECTIVE IN A VIRTUAL THREE-DIMENSIONAL ENVIRONMENT

(75) Inventor: Thomas J. Padula, Palo Alto, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 08/895,264

(22) Filed: Jul. 16, 1997

(51) Int. Cl.[7] .................................................. G06F 17/00
(52) U.S. Cl. ............................ 700/94; 381/310; 381/306
(58) Field of Search .................................. 381/300, 306, 381/310; 463/35; 345/32, 427; 700/94

(56) References Cited

U.S. PATENT DOCUMENTS

| | | | |
|---|---|---|---|
| 4,817,149 | 3/1989 | Myers | 381/1 |
| 5,208,860 | 5/1993 | Lowe et al. | 381/17 |
| 5,337,363 | 8/1994 | Platt | 381/17 |
| 5,412,731 | 5/1995 | Desper | 381/1 |
| 5,422,653 | 6/1995 | Maguire, Jr. | 345/9 |
| 5,438,623 | 8/1995 | Begault | 381/17 |
| 5,479,597 | * 12/1995 | Fellous | 395/154 |
| 5,714,997 | * 2/1998 | Anderson | 348/39 |
| 5,754,660 | * 5/1998 | Shimizu | 381/17 |
| 5,768,393 | * 6/1998 | Mukojima et al. | 381/17 |
| 5,952,993 | * 9/2000 | Matsuda et al. | 345/121 |

* cited by examiner

Primary Examiner—Xu Mei
Assistant Examiner—Laura A. Grier
(74) Attorney, Agent, or Firm—Sterne, Kessler, Goldstein & Fox P.L.L.C.

(57) ABSTRACT

A system and method for correcting discrepancies in the apparent location of audio sources in a computer representation of a three-dimensional environment is provided. The system and method compensate for distortions created by disparities between the virtual camera field of view and the observer's field of view. The system and method further provide for appropriate adjustments to audio sources outside of the observer's field of view.

14 Claims, 5 Drawing Sheets

ACOUSTIC PERSPECTIVE IN A VIRTUAL THREE-DIMENSIONAL ENVIRONMENT

FIELD OF THE INVENTION

The invention relates generally to positioning of audio sources in a computer representation of a three-dimensional environment. More particularly, the invention relates to obtaining an acoustic perspective consistent with visual perspective by compensating for distortions in the apparent location of an audio source in a computer representation of a three-dimensional environment, especially those distortions that are created by disparities between the computer field of view and an observer's field of view.

BACKGROUND OF THE INVENTION

Virtual reality is computer-generated simulation of a three-dimensional environment in which a user's perspective is dynamically alterable while the user interacts with and observes the environment. Although there are numerous possible ways for a user to interact with a virtual environment, typical interaction includes observing the environment by viewing and listening to the virtual environment. A user typically perceives the virtual environment as if the user were looking through a camera viewfinder or at an image being received from a video camera and displayed on the computer screen. In a standard graphical user interface, the image will be displayed in a window on the computer screen, although stereoscopic goggles and other viewing devices are also used.

Virtual environments are not real; they are data constructs stored in a computer that are viewed using a rendering engine, a computer process for rendering or drawing an image of the virtual environment data constructs on the computer screen. Various file formats and data structures have been developed for virtual environments, but VRML (Virtual Reality Modeling Language) has become a commonly recognized standard in the field, particularly for virtual worlds which are accessed over the World Wide Web.

VRML is a computer language for creating VRML scenes, virtual worlds comprised of three-dimensional objects. The primary data object in VRML is a node and there are several different types of nodes in VRML. A node can be used to define a particular three-dimensional object, such as a Sphere node or a Cube node. A node can also define characteristics of nodes defined subsequently in the scene graph, (the data file of a VRML world), such as a Material node which defines the surface material properties of subsequent shape nodes. Additional VRML nodes used by the rendering engine include, for example, PointLight (omni-directional light source) and LOD (varying level of detail representations for a single object depending on the perceived distance) nodes.

Objects in a VRML world can have several different properties, including the ability to generate sound (i.e., act as a source of audio signals). In particular, a Sound node defines sound generation properties in VRML, such as the location of the sound source, and the direction, intensity, and effective angle of the generated sound. These generated sounds are typically heard by the user through stereo speakers positioned alongside the computer video screen, although headphones and sophisticated multichannel sound systems are also available.

VRML scene graphs are sequential listings of VRML nodes that, when properly rendered, generate virtual worlds. Properly rendering a VRML world requires a special web-browser or application such as Silicon Graphics WebSpace or CosmoPlayer. These applications interpret the VRML scene graph and render a complex three-dimensional world, providing the user with a virtual camera looking into the virtual world.

The virtual cameras of the rendering engines are not limited to a single fixed length lens. Different virtual camera focal lengths may be selected by the VRML scene author or, alternatively, a virtual camera with an adjustable focal length may be used. In much the same way as a photographer or videographer can "zoom in" to obtain a magnified but narrower image by increasing the focal length of the lens, (e.g., using a telephoto lens), a user's view through the virtual camera can be "zoomed in." Similarly, a user's view of the virtual world can be expanded if the virtual camera "zooms out," much as a photographer's or videographer's view changes when a wide angle lens with a relatively short focal length is mounted on the camera.

These rendering engines do not just render a three-dimensional visual environment, they also render a three-dimensional aural environment. The single-channel (i.e., monophonic) sounds generated by the sound emitter nodes are rendered stereophonically to simulate three-dimensional positioning of the audio source. Simulation of three-dimensional audio positioning is a complex process typically involving convolution of Head-Related Transfer Functions and appropriate interaural amplitude and delay values. Although the exact techniques used are dependent on the specific rendering engine, the effect sought is identical: to make the sounds heard by the user appear to come from the appropriate location in the three-dimensional environment being rendered.

In order to provide a rendering engine with a location of an audio source that is consistent with a user's visual perception of the audio source's location, (i.e., coordinate the user's acoustic perspective and visual perspective) it is often not enough to merely provide the audio source coordinate location in the virtual environment. Because the focal length and field of view of the virtual camera is variable while the user's focal length and field of view are relatively fixed, the user's field of view and the virtual camera field of view will often be unequal. When this occurs, the visually perceived location of an audio source may be distorted by differences between the respective fields of view, especially at the boundaries of the field of view.

Moreover, because objects outside of the field of view can be audibly perceived as having a location relative to the viewed objects, any differences between user and virtual camera fields of view can distort the apparent location of these objects, even though they are not visually perceived by the listener at that instant. In addition, because of the primarily visual nature of human perception, human beings frequently tune out sounds in which they are not presently interested. This phenomenon is readily observed at a cocktail party or other large gathering where a person is able to conduct a conversation with another person they are looking at even though the volume of background noise (e.g., other conversations) is as high as (or higher than) the conversation.

Virtual reality is not experienced solely by sight, and hearing must be considered when creating a virtual environment. Therefore, it is necessary to account for the interaction between seeing and hearing in human beings before sounds can become an integrated part of a virtual world. Proper positioning of audio sources in three-dimensional virtual environments therefore requires consideration of how the audio sources are both visually and aurally perceived. However, there are a wide variety of techniques for simulating individual sound sources in three-dimensional environments, many of which are uniquely adapted for particular conditions, equipment, rendering engines and modeling languages. Accordingly, it is desirable to provide a generic solution that addresses the perceived dislocation in audio sources and is readily adaptable for use in a variety of three-dimensional virtual reality environments.

It is therefore necessary to provide a technique for reconciling the aurally perceived location of an audio signal source with its visually perceived location by providing the virtual reality rendering system with coordinates that identify the appropriate location of an audio source in accordance with a user's visual perception of the virtual environment. In particular, it is necessary to correct distortions introduced by the disparity between the virtual camera field of view and a user's field of view. It is also desirable to account for differences in perception of off-screen and on-screen objects, as well as the diminishing acoustic relevance of objects in relation to their distance from the user's field of view.

SUMMARY OF THE INVENTION

In view of the foregoing, there is a need to appropriately position audio sources in a three dimensional virtual environment such that the visually perceived and aurally perceived locations of the audio source correspond. This invention provides a novel technique for obtaining a visually consistent acoustic perspective that compensates for distortions in apparent audio source location and is readily adaptable to a variety of three-dimensional environment representations and independent of the particular audio source modeling techniques. By coordinating aural and visual perceptions of audio sources, a virtual environment is able to more closely parallel reality and thereby enhance the observer's experience.

There are essentially two primary components of a virtual environment: a computer-readable representation of the environment and a rendering engine that renders a virtual world from the computer-readable representation in accordance with a viewpoint on the virtual world. The computer-readable representation is typically a data structure wherein the objects of the virtual world are defined. One example of such a virtual world data structure is a VRML scene graph. The object definitions typically include the characteristics of the objects in the virtual world, including the shape, size and location of the defined objects. These characteristics are not static and can change when, for example, the object moves. One example of a defined object in a virtual world is a Sound node in VRML. The location of an object is typically defined by its coordinates in a right-handed, three-dimensional Cartesian coordinate system.

The rendering engine creates a computerized representation of the virtual world corresponding to the defined objects and the observer's viewpoint. A rendering engine interprets the computer-readable representation, determining what objects can be seen and heard from the observer's current viewpoint and rendering the appropriate graphical image and sounds.

The present invention provides a third element interposed between the computer-readable representation and the rendering engine (although it may be integrated directly into the rendering engine if desired). In the present invention, the location coordinates of audio signal sources are correlated with the graphical representation before audio signal rendering. In particular, the difference between the virtual camera field of view and the user's field of view is determined. This difference is then used to warp the locations of audio sources in proportion to this determined difference, and these warped locations are provided to the rendering engine to render the audio portion of the virtual environment.

The present invention also provides appropriate attenuation for objects that are outside of the field of view and hence "off-screen." When a virtual camera is zoomed in and therefore has a relatively narrow field of view, the observer's attention is directed to the objects within the field of view and it is considered desirable to reduce the effect of proximate but unseen audio signal sources. In essence, the observer is provided with a directional microphone that is coordinated with the virtual camera lens. The amplitude of off-screen audio sources is accordingly attenuated, with the amount of attenuation being proportionate to the relative distance of the audio source from the boundaries of the field of view. This appropriately attenuated signal level is then provided to the rendering engine.

Because the present invention can be interposed between the computer-readable representation and the rendering engine, it can be independent of and transparent to both, advantageously making it readily applicable to a variety of virtual reality rendering and modeling techniques and apparatus. Advantageously, the present invention is also equally applicable to computer representations of the real world.

Additional features and advantages of the present invention will be understood from the following description of its preferred embodiments, which description should be taken in conjunction with the accompanying drawings.

DETAILED DESCRIPTION

A novel technique for reconciling an observer's acoustic perspective of a virtual environment with the observer's visual perspective by positioning audio sources at locations that correspond to the observer's visual perception of the audio source location is described herein.

Virtual reality is computerized simulation of a three-dimensional environment generated from a data structure written in a specialized computer language and interpreted by an appropriate rendering engine. The rendering engine generates a visual representation of the three-dimensional environment described by the data structure. The visual representation is viewed on a computer display screen as if the observer were looking at the world through a video camera coupled to a window on the observer's computer.

Virtual reality modeling language (VRML) is a specialized language for creating virtual environments that has become a recognized standard, particularly for creating virtual worlds that are viewed on the Internet. The basic data object of VRML is a node, and a virtual world constructed using VRML (a scene graph) is comprised of several nodes, each of which may have specific characteristics and properties. VRML scene graphs are rendered into three-dimensional virtual environments by specialized rendering engines that can interpret the VRML nodes and generate a graphic representation of the virtual world described as it would appear from a particular observer perspective. An example of such a rendering engine is Silicon Graphics CosmoPlayer.

Virtual worlds can be seen as well as heard if the rendering engine includes an appropriate audio renderer and the modeling language supports audio. Recent revisions to VRML include a Sound node which behaves similarly to shape and light nodes (i.e., is affected by the current transform) and has a defined coordinate location. Compatible rendering engines such as Silicon Graphics CosmoPlayer incorporate the necessary audio renderer to provide the observer with an acoustic perspective of the virtual environment.

Figure 1:
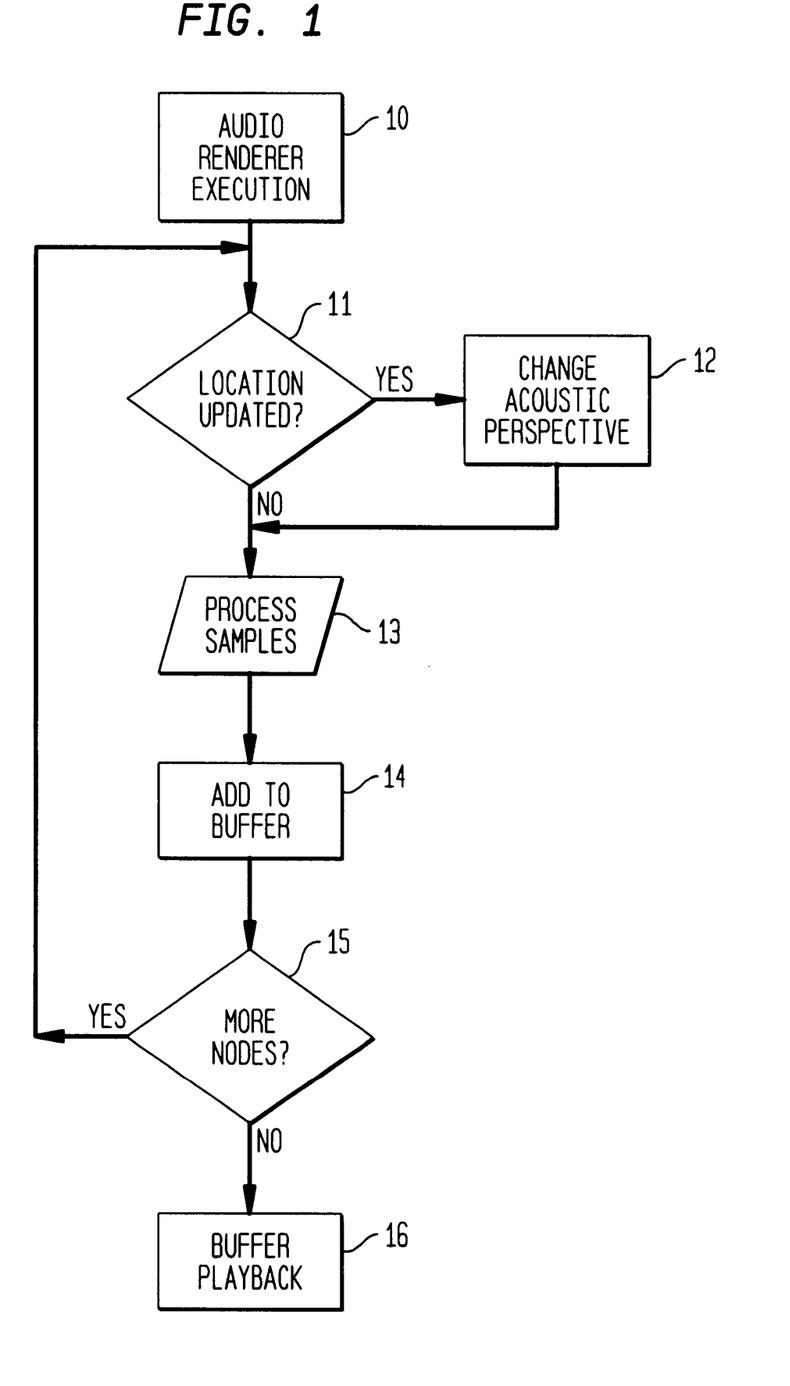
FIG. 1 is a flow chart representation of the operation of an embodiment of the present invention in the audio renderer portion of a node-based virtual environment rendering engine.

In one embodiment of the present invention, a rendering engine for a nodal modeling language (e.g., VRML) is modified to provide a correct acoustic perspective in accordance with the present invention. Referring to FIG. 1, the audio renderer element of the rendering engine is executed at regular intervals (30 times a second in CosmoPlayer) as shown at 10. A scene manager provides the audio renderer with the location coordinates and other characteristics of the relevant node and, as shown at decision block 11, only if the location has transformed (i.e., the observer's viewpoint or the node moved) is the acoustic perspective changed as shown at 12.

An advantageous feature of an embodiment of the present invention is the relative ease with which the acoustic perspective correction may be integrated into the audio renderer. Because the present invention may be applied to nodal modeling languages (or any computer representation of objects capable of emitting sound, including a computerized image of real objects) by altering characteristics of the node which are already used by the audio renderer (e.g., location and intensity), the acoustic perspective correction of the present invention need only be applied before a node is rendered without any change in the rendering process. Of course, once the acoustic perspective of a node has been adjusted, it does not have to be readjusted until the location of the node (relative to the observer) has changed.

Referring to FIG. 1, once the proper acoustic perspective coordinates have been determined, a block of audio samples associated with the node is processed as shown by block 13. The processed samples are added to an audio buffer, as shown in block 14, and, if there are unprocessed audio nodes in the scene graph, the process is repeated as shown by decision block 15. If there are no more nodes, then the buffer is played back as shown by block 16.

Figure 2:
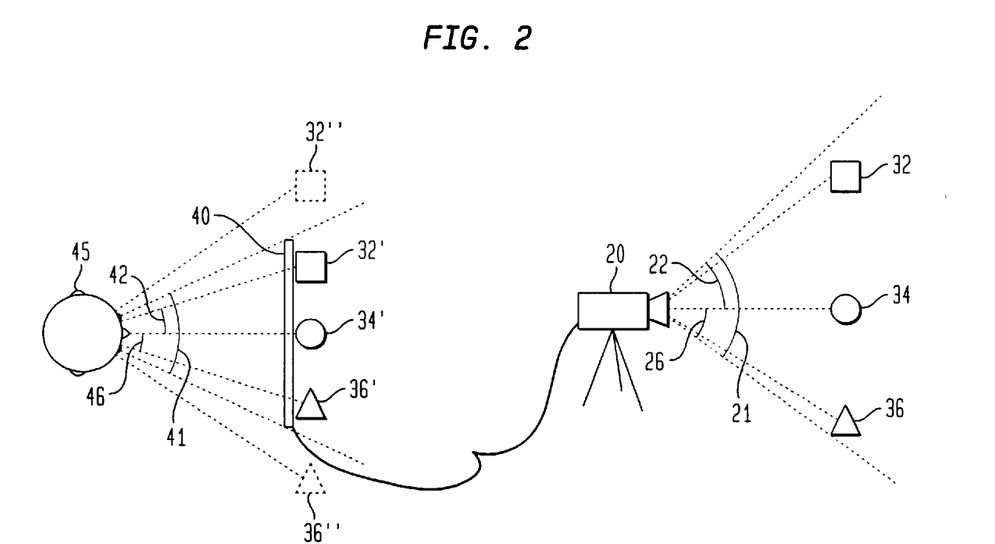
FIG. 2 is a diagrammatic representation of distortions in apparent location of virtual sound sources that occur when the virtual camera is zoomed out and its field of view is wider than the observer's field of view.

Referring now to FIG. 2, operation of the present invention when the virtual camera field of view is greater than the observer's field of view (i.e., the observer has zoomed out the virtual camera to a wide angle view) is illustrated. For clarity of explanation, only operation with respect to azimuth is described. Virtual camera 20 has a field of view 21 that encompasses audio sources 32, 34 and 36. Audio sources 32 and 36 are positioned at opposite edges of the camera field of view while audio source 34 is positioned at the center. Angle 22 is the azimuth for audio source 32 and angle 26 is the azimuth for audio source 36.

The virtual image is displayed in a window 40 viewed by observer 45 and audio sources 32', 34' and 36' are visible on window 40. However, the observer's field of view 41 is narrower than the virtual camera field of view 21, and the azimuth 42 for audio source 32' and the azimuth 46 for audio source 36' are proportionately smaller than the corresponding azimuth angles in the virtual environment. Although the observer's visual perspective on the virtual environment is compressed because the observer's field of view is narrower than the virtual camera field of view, an audio rendering engine will normally process the audio sources without accounting for possible differences in fields of view and will render the audio signals generated by audio sources 32 and 36 as if they were at 32" (i.e., at an azimuth value equal to azimuth 22) and 36" (i.e., at an azimuth value equal to azimuth 26) respectively. The observer 45 will then aurally perceive the sounds generated by audio sources 32 and 36 as if they were coming from sources outside of her field of view and may have difficulty correlating the sounds she hears with the objects she sees.

By identifying the observer's field of view 41 and the observer's perceived azimuths 42 and 46, the present invention ensures that the rendering engine renders audio signals emitted by audio sources 32 and 36 as if the sources were at the locations seen by the observer. Accordingly, the observer acoustically perceives audio source 32 at 32' and not at 32". Similarly, observer 45 will hear audio signals emitted by audio source 36 as if they were coming from 36' and not at 36". Accordingly, the observer's acoustical perspective of the virtual environment corresponds with the observer's visual perspective of the virtual environment.

Figure 3:
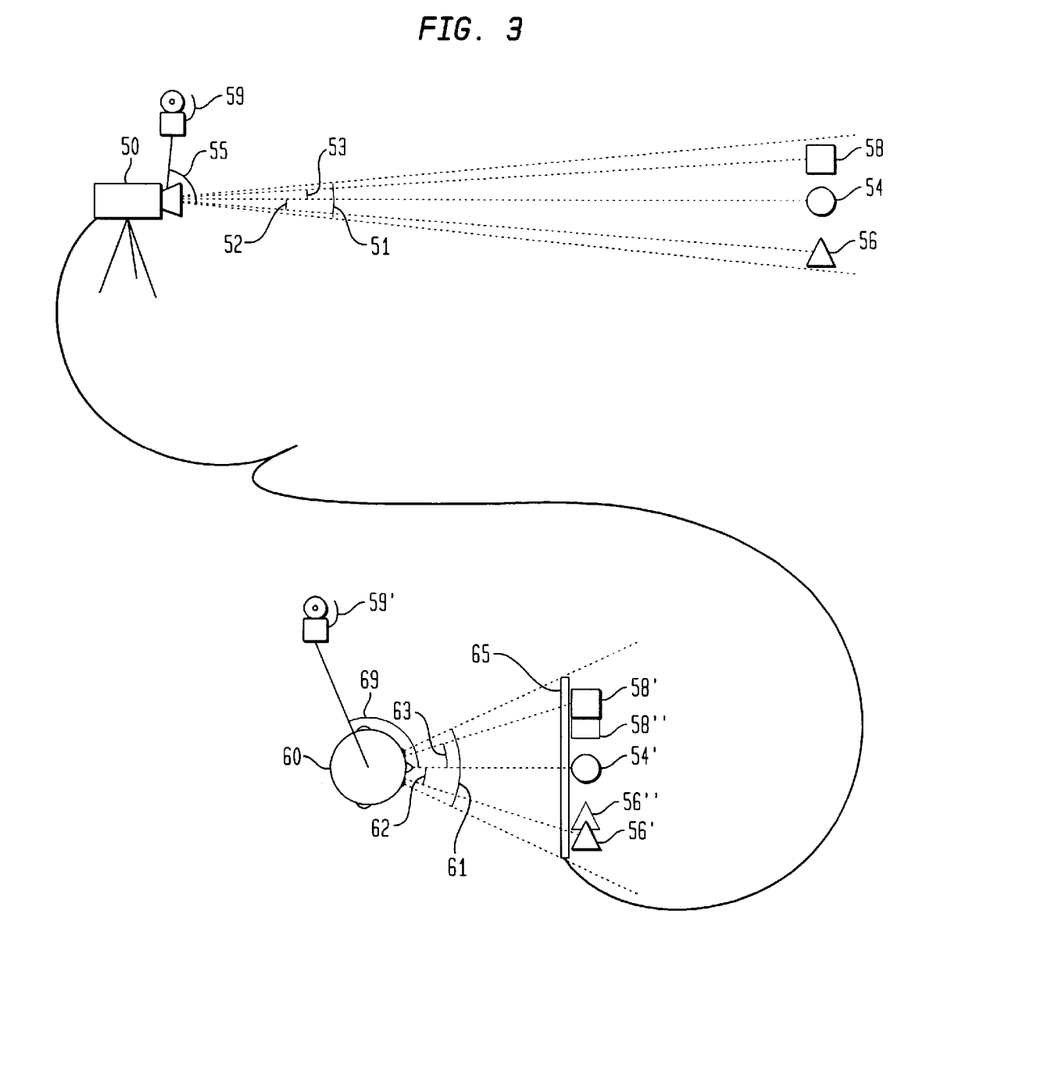
FIG. 3 is a diagrammatic representation of distortions in apparent location of virtual sound sources that occur when the virtual camera is zoomed in and its field of view is narrower than the observer's field of view.

Referring now to FIG. 3, operation of the present invention when the virtual camera field of view is less than the observer's field of view (i.e., the observer has zoomed in the virtual camera to a telephoto view) is illustrated. As with FIG. 2, only operation with respect to azimuth is described for purposes of clarity.

Virtual camera 50 has a field of view 51 that encompasses audio sources 54, 56, and 58. Audio sources 56 and 58 are positioned at opposite edges of the camera field of view while audio source 54 is positioned at the center. Angle 52 is the azimuth for audio source 56 and angle 53 is the azimuth for audio source 58. Audio source 59 is outside of the field of view of virtual camera 49 at azimuth 55, but can nevertheless be heard.

The virtual image is viewed by observer 60 in window 65. Audio sources 54', 56', and 58' are visible on window 65. However, the observer's field of view 61 is wider than the virtual camera field of view 51, and the azimuth 62 for audio source 56' and the azimuth 63 for audio source 58' are proportionately larger than the corresponding azimuth angles 52 and 53 in the virtual environment. Although the observer's visual perspective on the virtual environment is expanded because the observer's field of view is wider than the virtual camera field of view, an audio rendering engine will normally process the audio sources without accounting for possible differences in fields of view and will render the audio signals generated by audio sources 56 and 58 as if they were at 56" (i.e., at an azimuth value equal to azimuth 52) and 58" (i.e., at an azimuth value equal to azimuth 53) respectively. The observer will then aurally perceive the sounds generated by audio sources 56 and 58 as if they were not coming from 56' and 58' and may have difficulty correlating the sounds she hears with the objects she sees.

By identifying the observer's field of view 61 and the observer's perceived azimuth 62, the present invention ensures that the rendering engine renders audio signals emitted by audio source 56 such that the observer acoustically perceives audio source 56 at 56' and not at 56". Similarly, the observer will hear audio signals emitted by audio source 58 as if they were coming from 58' and not at 58". The acoustical perspective on audio source 59' is modified in two ways by the present invention. First, the apparent position of audio source 59' is warped in proportion to the relative fields of view such that azimuth 69 is greater than azimuth 55. Second, the amplitude of audio source 59' is attenuated in accordance with its acoustical perspective.

In particular, focal attenuation due to acoustical perspective (attenuation by the audio renderer is typically separate and distinct) ranges from none to a value determined by the ratio between fields of view 51 and 61, and the amount of focal attenuation within that range is determined from the difference between azimuth 69 and a bisection of field of view angle 61. Accordingly, the amplitude of an object is attenuated in proportion to how far the object is outside of the observer's field of view and how much the observer's field of view differs from the virtual camera field of view.

Figure 4:
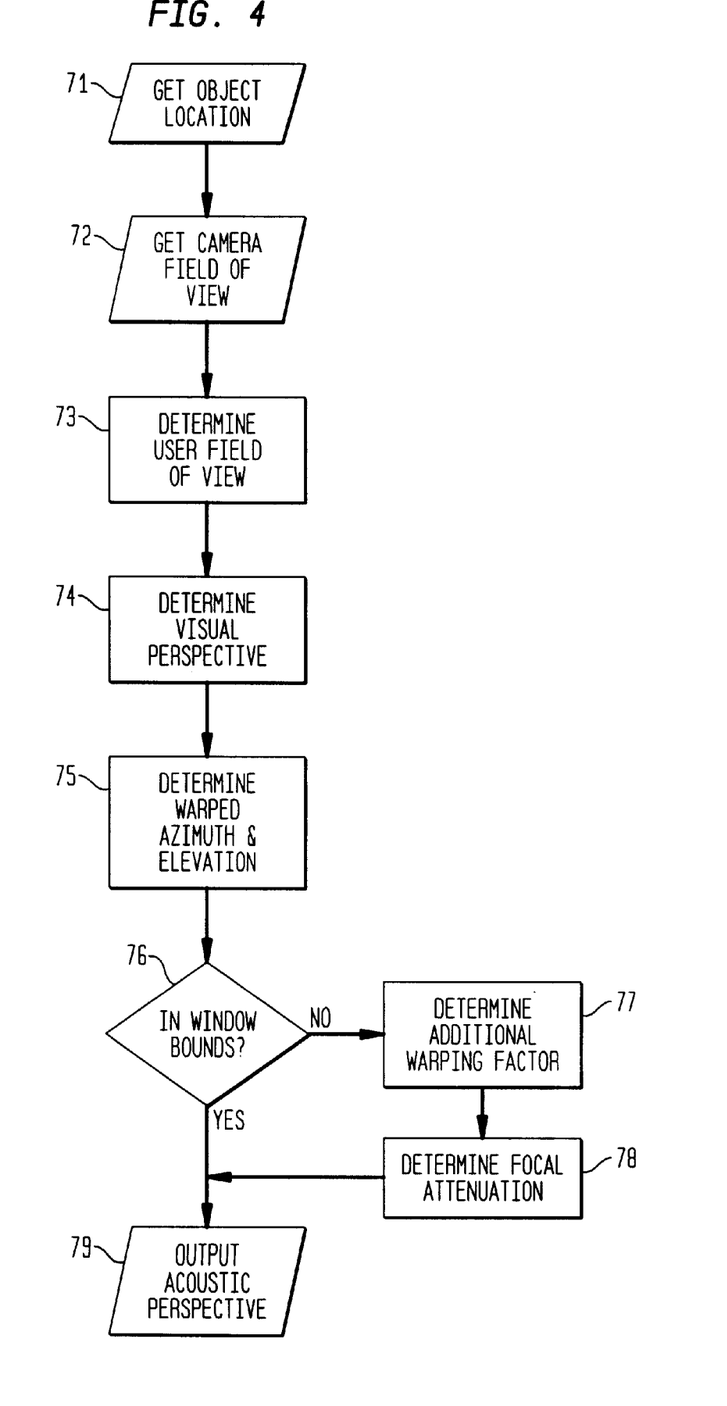
FIG. 4 is a flow chart representation of an embodiment of the present invention for providing a visually correlated acoustic perspective on an audio source in a virtual three-dimensional environment.

FIG. 4 represents an embodiment of the present invention wherein the observer's acoustic perspective on an audio source is determined by warping the azimuth (horizontal or x) and elevation (vertical or y) angles describing the audio source location relative to the observer, as well as by providing an appropriate focal attenuation of the amplitude of audio sources outside of the observer's viewing frustum. Although this disclosed embodiment of the present invention relates to a user observing a nodal virtual environment in a window on a computer display, the invention is not so limited and is applicable to other types of three-dimensional environments and other ways of observing the environment.

In the embodiment of the present invention described herein, the acoustic perspective on an audio source is determined by: (1) determining the location of the audio source in the virtual environment as perceived by a virtual camera; (2) determining the field of view of the virtual camera; (3) determining the field of view of the observer; (4) determining the visual perspective on the audio source; (5) determining the acoustic perspective on the audio source if it is within the observer's field of view; and (6) determining the acoustic perspective and, if appropriate, focal attenuation, on the audio source if it is outside of the observer's field of view. The acoustic perspective is then provided to the audio renderer for rendering of the audio signal emanating from the acoustic perspective location.

Referring to FIG. 4, determining acoustic perspective begins by identifying the relative location of the audio source in the virtual environment as shown by input/output block 71. In an embodiment of the present invention for a nodal environment such as VRML, the coordinate location of the audio source is described by azimuth and elevation angles provided by the scene manager. In an alternative embodiment of the present invention, the location of the audio source may be provided as x, y, and z coordinates (either relative to the virtual camera or with respect to an absolute frame of reference) or polar coordinates. In an alternative embodiment of the present invention where the location of the audio source relative to a virtual camera or viewing perspective is not provided, the relative location must be calculated.

As shown by input/output block 72, once the location of the audio source with respect to a virtual camera or viewpoint is determined, the field of view of the virtual camera (or viewpoint) is then identified. In VRML, one dimension of the virtual camera field of view is a characteristic of the current viewpoint which may be retrieved by an appropriately directed function. As noted, however, the retrieved field of view is a single value describing the field of view in one dimension only, that dimension being the lesser of the two dimensions describing the rectangular face of the virtual camera viewing frustum.

Figure 5:
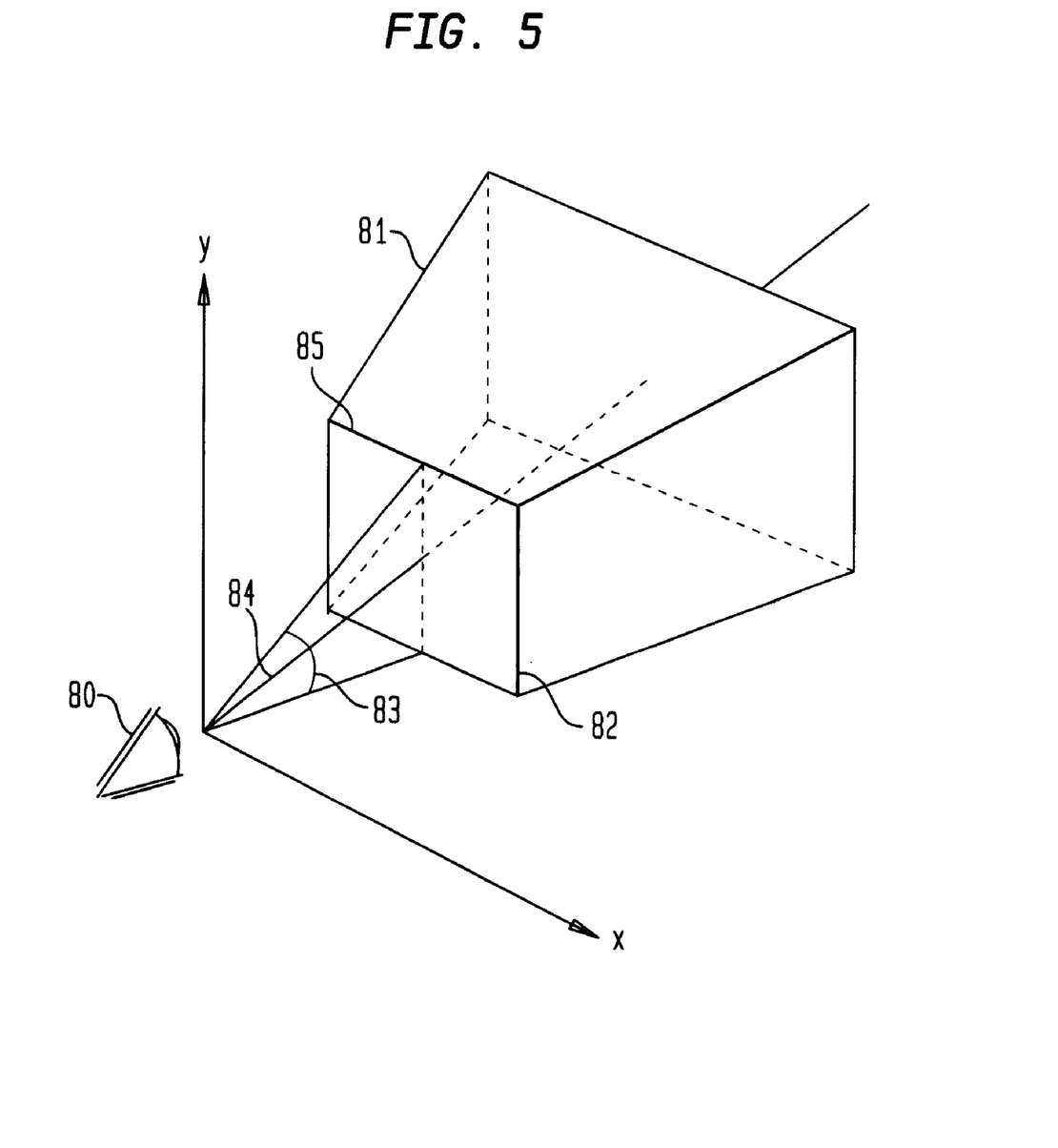
FIG. 5 is a diagrammatic representation of a viewing frustum illustrating an elevation angle.

Referring now to FIG. 5, a viewpoint 80 and corresponding viewing frustum 81 are illustrated. For a typical rectangular window with a landscape orientation, as illustrated, the lesser dimension is the height of the window 82 and the retrieved field of view parameter is therefore the elevation angle 83. The viewpoint depth 84 is the linear distance from the viewpoint to a rectangular face of the frustum. The azimuth (not shown) is the perpendicular angle describing the horizontal parameters of the field of view corresponding to the greater dimension 85 of the rectangular window.

If an angle of a rectangular field of view and the dimensions of the viewing rectangle are known, then the other angle of the rectangular field of view can be readily determined. In an embodiment of the present invention for use with VRML, the viewing window dimensions are readily obtained by an appropriately directed function. Thus, in one embodiment of the present invention, the camera field of view angle perpendicular to the retrieved field of view angle is determined from the window dimensions.

In an embodiment of the present invention, the camera depth (distance from the virtual camera to the virtual image plane formed by the intersection of the virtual camera viewing frustum and the observer's viewing frustum) is determined trigonometrically from the retrieved field of view and the corresponding window dimension. The perpendicular viewing angle is then determined trigonometrically from the camera depth and the perpendicular window dimension. In an alternative embodiment of the present invention, the aspect ratio of the viewing window is provided by an appropriately directed function and the perpendicular camera field of view angle may be derived therefrom.

Referring again to FIG. 4 and processing block 73, the observer field of view is then determined. In an alternative embodiment of the present invention, complete determination of the observer's field of view may be postponed until the observer's visual perspective on the audio source and the acoustic perspective on the audio source, if it is within the observer's field of view, are determined. Accordingly, determination of the observer's field of view need not precede determination of the visual perspective on the audio source.

However, the observer depth (i.e., distance from the virtual camera to the virtual image plane formed by the intersection of the virtual camera viewing frustum and the observer's viewing frustum) is used to determine the acoustic perspective on the audio source in this embodiment of the present invention and therefore precedes determination of the warped azimuth and elevation. The observer depth can be expressed as the distance from the observer to the window measured in pixels. In an embodiment of the present invention, this value is determined from the screen resolution (e.g., dots per inch) and an environmental variable (e.g., distance from the observer to the computer monitor measured in inches). In an alternative embodiment of the present invention, the physical distance between the observer and the viewing surface may be determined dynamically by measurement. In another alternative embodiment of the present invention, the distance is established by requiring the observer to occupy a predetermined position. In another embodiment of the present invention, the observer may provide the computer system with information indicating the observer's distance in response to a prompt.

In an embodiment of the present invention related to a rectangular viewing window, the horizontal and vertical parameters of the observer's field of view are derived from the virtual camera field of view and the observer depth. The horizontal parameters of the observer's field of view are determined trigonometrically from the arctangent of the angle formed by the maximum x-coordinate (as measured from the center of the window) and the observer depth. The maximum x-coordinate is determined trigonometrically from the virtual camera depth and the tangent of the bisection of the horizontal virtual camera field of view angle. The vertical parameters of the observer's field of view are similarly determined from the maximum y-coordinate and the vertical angle of the virtual camera field of view.

Referring to processing block 74, the visual perspective on the audio source is then determined. In an embodiment of the present invention, the visual perspective on the audio source may be described by Cartesian coordinates of the viewing window wherein the x-coordinate (assuming the origin is located in the center of the window) is derived trigonometrically from the camera depth and the tangent of the azimuth and the y-coordinate is derived trigonometrically from the camera depth and the tangent of the elevation. In an alternative embodiment of the present invention, the visual perspective may be defined by polar coordinates or otherwise. It is important to note that there can be a visual perspective on an audio source even though the audio source is not within the observer's viewing window.

Once the visual perspective on the audio source has been determined, an initial determination of the acoustic perspective may be made using the observer depth. As shown by processing block 75, the acoustic perspective is initially expressed as azimuth and elevation values warped in accordance with the visual perspective. In an embodiment of the present invention, the warped elevation is derived trigonometrically from the arctangent of the angle formed between the y-coordinate describing the location of the audio source in the window and observer depth. The warped azimuth is similarly derived trigonometrically from the arctangent of the angle formed between the x-coordinate describing the location of the audio source in the window and observer depth.

As shown by decision block 76, if the visual perspective on the audio source is within the window boundaries, then the acoustic perspective has been satisfactorily determined and is provided to the rendering engine in an embodiment of the present invention. In an alternative embodiment of the present invention, audio sources near the center of a wide angle view may be focally attenuated to compensate for the object distortions induced by the wide angle perspective.

However, in the illustrated embodiment of the present invention, if the visual perspective is outside of the window boundaries, then the acoustic perspective requires additional warping. It should be noted that azimuth and elevation are evaluated independently. Accordingly, an audio source which is outside of the observer's field of view in one dimension (e.g., the horizontal coordinate of the audio source is outside of the window) but would otherwise be within the field of view (e.g., the elevation of the audio source is within the vertical angle of the observer's field of view) will only have additional warping applied to the parameter which is outside of the observer's field of view (e.g., the azimuth and not the elevation).

In an embodiment of the present invention, whether the audio source is within the window boundaries is determined from the field of view of the virtual camera and the visual perspective (azimuth and elevation) on the acoustic source. If the azimuth exceeds the horizontal angle of the virtual camera field of view or the elevation exceeds the vertical angle of the virtual camera field of view then the audio source is outside of the window boundaries.

If the audio source is outside of the window boundaries, an additional warping factor is determined for the dimension(s) exceeding the window boundaries as shown by processing block 77. This warping factor is proportional to the differences between the observer's field of view and the camera field of view as well as to the extent to which the audio source is outside of the window boundaries.

The difference between the observer's field of view and the virtual camera field of view may then be determined for each dimension (e.g., azimuth and elevation). This difference and an appropriate warping factor are then applied to the on-screen acoustic perspective parameter to determine the off-screen acoustical perspective.

In an embodiment of the present invention, a linear warping factor is determined as a function of the ratio between the visual perspective on the audio source and the virtual camera field of view such that the warping factor is inversely proportional to the difference between the visual perspective and the virtual camera field of view. Accordingly, an audio source which is far beyond the window boundary is warped proportionately less than an audio source which is relatively close to the window boundary. This advantageously provides for smooth transitions as the observer's perspective shifts and audio sources move in and out of the observer's field of view. In an alternative embodiment of the present invention, a non-linear warping factor may be derived to achieve a corresponding nonlinear expansion of the off-screen angles.

The acoustic perspective on a audio source which is outside of the observer's field of view may be further modified by focal attenuation as shown by processing block 78. In an embodiment of the present invention, an audio source is only focally attenuated if the observer zooms in (i.e., the observer's field of view is greater than the virtual camera field of view). Focal attenuation of an audio source is a reduction in the amplitude of the audio signal generated by the audio source which is proportional to how far the acoustic perspective on the audio source extends beyond the screen boundaries and the ratio between the virtual camera field of view and the observer's field of view.

Focal attenuation coordinates the audio rendering of the virtual environment with the visual rendering of the virtual environment by de-emphasizing the audio signals generated by audio sources outside of the observer's field of view. Audio sources which are "behind" the virtual camera in the virtual environment are more attenuated than audio sources which are in front of the virtual camera. Similarly, audio sources which are relatively far outside of the observer's field of view are more attenuated than audio sources that are closer to the observer's field of view. In essence, an observer is able to zoom in a virtual directional microphone along with the virtual camera lens.

In an embodiment of the present invention, focal attenuation is determined by first determining how far outside of the observer's field of view the acoustic perspective is and then determining how far the virtual camera has been zoomed in. The first determination is made by applying spherical geometry and Napier's rules to the acoustic perspective (including the warping factor) on the audio source and to the screen boundaries. This determination is then normalized into a factor having a value of 0 at the screen boundary and 1 at 180°. This normalized factor is then scaled by the ratio between the virtual camera field of view (focal length) and the observer's field of view (focal length) to determine the focal attenuation factor.

In an alternative embodiment, focal attenuation may be applied to audio sources within an image when the virtual camera has been zoomed out for a wide angle view. In this alternative embodiment, audio sources may be attenuated in proportion to their proximity to the center of the image, deemphasizing these audio sources to allow an observer to hear all of the viewed audio sources without possible inappropriate emphasis caused by, for example, differences in fields of view.

As shown in FIG. 4, the acoustic perspective on the audio source is then provided to the audio renderer for rendering in input/output block 79. Accordingly, the audio signals will be aurally rendered as if coming from their visually perceived locations.

Although various embodiments are specifically illustrated and described herein, it will be appreciated that modifications and variations of the present invention are covered by the above teachings and within the purview of the appended claims without departing from the spirit and intended scope of the invention. For example, focal attenuation may be applied to objects within the field of view when the virtual camera is zoomed out or the field of view may be circular or have another shape. Moreover, the disclosed acoustic perspective techniques may be used for three-dimensional computer entertainment, a flight simulator or similar applications. In addition, the present invention may be applied to a computer representation of a real environment.

What is claimed is:

1. A method of positioning an audio source in a computer representation of a three-dimensional environment comprising the steps of:

determining a first coordinate location of said audio source in said computer representation of a three-dimensional environment;

determining a visual perspective location of said audio source in said computer representation of a three dimensional environment;

positioning said audio source at an acoustic perspective location corresponding to said visual perspective location in said computer representation of a three-dimensional environment;

determining a field of view of an observer of said audio source;

determining whether said visual perspective location of said audio source is within said field of view of said observer; and attenuating said audio source if said visual perspective location of said audio source is outside of said field of view of said observer, wherein said step of attenuating said audio source if said visual perspective location of said audio source is outside of said field of view of said observer comprises determining the field of view of a viewpoint through which said observer views said computer representation of a three-dimensional environment, determining the ratio of said field of view of said viewpoint to said field of view of said observer, determining how far said visual perspective location of said audio source is outside of said field of view of said observer, and attenuating said audio source in accordance with said ratio and said determination of how far said visual perspective location of said audio source is outside of said field of view of said observer.

2. The method of positioning an audio source in a computer representation of a three-dimensional environment of claim 1 wherein said step of determining a visual perspective location of said audio source comprises:

determining the field of view of a viewpoint on said computer representation of a three-dimensional environment;

determining the size of an image of said computer representation of a three-dimensional environment from said viewpoint; and determining the location of said audio source relative to said viewpoint and said image from said viewpoint.

3. The method of positioning an audio source in a computer representation of a three-dimensional environment of claim 2 wherein said viewpoint comprises a virtual camera.

4. The method of positioning an audio source in a computer representation of a three-dimensional environment of claim 2 wherein said image from said viewpoint is a rectangular window.

5. The method of positioning an audio source in a computer representation of a three-dimensional environment of claim 1 wherein said computer representation of a three-dimensional environment is a virtual world.

6. The method of positioning an audio source in a computer representation of a three-dimensional environment of claim 1 further comprising:

determining the field of view of an observer of said audio source;

determining whether said visual perspective location of said audio source is within said field of view of said observer; and attenuating said audio source if said visual perspective location of said audio source is within said field of view of said observer.

7. The method of positioning an audio source in a computer representation of a three-dimensional environment of claim 1 wherein said step of determining a visual perspective location of said audio source in said computer representation of a three-dimensional environment comprises:

determining the viewing angle of a viewpoint from which an image of said computer representation of a three-dimensional environment is generated; and determining the location of said audio source on the image plane of the generated image of said computer representation of a three-dimensional environment.

8. The method of positioning an audio source in a computer representation of a three-dimensional environment of claim 7 wherein said step of positioning said audio source at an acoustic perspective location corresponding to said visual perspective location in said computer representation of a three-dimensional environment comprises:

determining the distance between said generated image and an observer viewing said generated image; and determining a second coordinate location of said audio source to an observer viewing said generated image at said determined distance; and positioning said audio source at said second coordinate location in said computer representation of a three-dimensional environment.

9. A system for positioning an audio source in a computer representation of a three-dimensional environment comprising:

means for determining a first coordinate location of said audio source in said computer representation of a three-dimensional environment;

means for determining a visual perspective location of said audio source in said computer representation of a three-dimensional environment;

means for positioning said audio source at an acoustic perspective location corresponding to said visual perspective location;

means for determining a field of view of an observer of said audio source;

means for determining whether said visual perspective location of said audio source is within said field of view of said observer; and means for attenuating said audio source when said visual perspective location of said audio source is outside of said field of view of said observer, wherein said means for attenuating said audio source when said visual perspective location of said audio source is outside of said field of view of said observer comprises means for determining the field of view of a viewpoint through which said observer views said computer representation of a three-dimensional environment, means for determining the ratio of said field of view of said viewpoint to said field of view of said observer, means for determining how far said visual perspective location of said audio source is outside of said field of view of said observer, and means for attenuating said audio source in accordance with said ratio and said determination of how far said visual perspective location of said audio source is outside of said field of view of said observer.

10. The system for positioning an audio source in a computer representation of a three-dimensional environment of claim 9 wherein said means for determining a visual perspective location of said audio source in said computer representation of a three-dimensional environment comprises:

means for determining the field of view of a viewpoint on said computer representation of a three-dimensional environment;

means for determining the size of an image of said computer representation of a three-dimensional environment from said viewpoint; and means for determining the location of said audio source relative to said viewpoint and said image of said computer representation of a three-dimensional environment from said viewpoint.

11. The system for positioning an audio source in a computer representation of a three-dimensional environment of claim 10 wherein said viewpoint comprises a computerized camera.

12. The system for positioning an audio source in a computer representation of a three-dimensional environment of claim 10 wherein said image of said computer representation of a three-dimensional environment from said viewpoint is a rectangular window.

13. The system for positioning an audio source in a computer representation of a three-dimensional environment of claim 9 wherein said means for determining a visual perspective location of said audio source in said computer representation of a three-dimensional environment comprises:

means for determining the viewing angle of a viewpoint from which an image of said computer representation of a three-dimensional environment is generated; and means for determining the location of said audio source on the image plane of the generated image.

14. The system for positioning an audio source in a computer representation of a three-dimensional environment of claim 13 wherein said means for positioning said audio source at an acoustic perspective location corresponding to said visual perspective location comprises:

means for determining the distance between said generated image and an observer viewing said generated image; and means for determining a second coordinate location of said audio source to an observer viewing said generated image at the distance between said generated image and said observer; and means for positioning said audio source at said second coordinate location.

* * * * *